2,962,379

METHOD OF PRESERVING COTTAGE CHEESE

Henry Leber, Syracuse, and Louis A. Perini, Liverpool, N.Y., assignors to Dairymen's League Co-Operative Association, Inc., New York, N.Y., a corporation of New York No Drawing. Filed Mar. 20, 1959, Ser. No. 800,638

9 Claims. (Cl. 99—162)

The present invention relates to a method of storing cottage cheese for long periods of time without deterioration.

The storage of cottage cheese has always presented a problem because of its rapid deterioration. For example, the shelf life of fresh cottage cheese in a home refrigerator ranges between 10 and 15 days. During this period of time, the product gradually deteriorates in both its taste and texture. At the end of this period of time the taste is so affected as to render it unpalatable and the curd has decomposed.

The desirability of storing cottage cheese has long been recognized because of the seasonal variations in milk production, but heretofore, no satisfactory method of storage without deterioration has been found. During the summer months milk production is at a peak while during the winter months the production materially decreases. The surplus milk produced during peak production is converted to milk products, such as cheese, butter, milk powder and others which may be stored. However, cottage cheese could not be stored during the period of peak production of milk because of its rapid deterioration. At temperatures above freezing, cottage cheese deteriorates in storage under all known processes of treatment which are practical and economically feasible. If cottage cheese is frozen the resulting product when thawed has a tough, hard and rubber-like texture. As a result cottage cheese could only be made from milk currently produced and consumed within a period of 15 days.

One of the objects of the present invention is to provide a method of treating cottage cheese which permits it to be stored for a long period of time without deterioration.

Another object is to provide a method of storing cottage cheese which does not alter the flavor or texture of the product.

Still another object is to provide a method of the type indicated which is comparatively simple and economical to practice and does not materially increase the cost of storage over the cost of storing similar products.

The method of the present invention comprises the steps of mixing cottage cheese curds with salt brine in a container which is chemically inert to the brine and curds. The salt brine is chlorinated to 10 p.p.m. and acidulated to a pH of 6.0. The brine is supplied in a quantity and concentration to completely immerse the curds and depress the freezing point of the entire mass to a temperature at or below 22° F. The mixture is then stored at a temperature above 32° F., as for example, 40° F., for a period of time sufficient to permit the brine to defuse and permeate the entire mass of curd. After the initial storage period, for example, 18 hours, the mixture is transferred to a cold storage room and stored for the period desired at a temperatrue in the range of 22° F. to 25° F. After the storage period, the brine is washed from the curd which is then ready for sale to the consumer. Advantageously, the product may be further treated by the use of additives, such as a mixture of cream and milk solids to improve the fat and solid content of the product.

The cottage cheese can be stored for long periods of time in accordance with the method of the present invention without deterioration. For example, cottage cheese stored for as long as three months in accordance with the method of the present invention showed no evidence of bacterial growth. Furthermore, no foreign odor could be detected and the product had the clean flavor of fresh cottage cheese. The stored product had a score of 97 and the shelf life in a home refrigerator even greater than the 10 and 15 days of freshly made cottage cheese. The brine in addition to permitting the product to be stored at a low temperature without freezing, also produces an inhibiting effect on bacteria and does not adversely affect the taste or texture of the product.

In accordance with a specific procedure, bags of "Cryovac," a laminated film of a polyvinylidene chloride resin as sold by Dewey & Almy, are used which measure 20 inches by 36 inches. The plastic bags are placed in metal cans of 60 pounds' capacity and spread to form a liner therein. Cottage cheese curd manufactured by a conventional method is then placed in the bag in the container to provide a layer on the bottom of the bag. Two quarts of a 25.14% sodium chloride solution containing chlorine in the ratio of 10 p.p.m. and acidulated to pH 6.0 by the addition of lactic, phosphoric or citric acid is then added to the top of the layer of curd. Curd is again added until the bag is about half full, after which two more quarts of the brine are added. Another layer of curd is added after which four quarts of the brine are poured on the curd in the top of the bag. The amount of curd is weighed as it is added in layers so that the resulting mixture in a bag comprises 45 pounds of cottage cheese curd and 19.9 pounds of brine which is sufficient to completely immerse the curd. The open end of the plastic bag filled with curd and brine is then gathered so as to expel air from the bag, and twisted into a rope to close the open end of the bag. The twisted closed end is fastened by applying an aluminum clip to the lower closed end of the rope and the loose end of the rope is tucked down between the bag and inner wall of the can A cover is applied to the top of the can and a dating tag applied.

The cans of packaged curd and brine mixture are placed in a refrigerated room held at 40° F. for period of 18 hours to permit the brine to defuse and thoroughly permeate the entire mass of curd. After the initial storage the cans are transferred to a cold storage room maintained at a temperature in a range between 22° F. and 25° F. for the period of storage required. The cans should be stacked in the cold storage room so that none of the cans contact each other or the walls of the room to allow circulation of air and avoid localized temperature differentials. The curds retain their original form and texture without freezing at this temperature and the bacterial count decreases during periods of storage which may be as long as six months or more.

When the cottage cheese is to be used after a period of storage the clips are removed from the plastic bags. The twisted rope ends of the bags are unwound and the loose ends of the bags pulled down over the exterior of the can in which it is contained. The curd and brine mixture of a number of cans is emptied into a cheese vat and fresh water at a temperature of 40° F. is added in the ratio of six volumes of water to one volume of mixed brine and curd. This dilute mixture is gently stirred in the vat for 15 minutes. At the end of the stirring operation the fluid is drained from the curd. The washing step is repeated, using the same quantity of wash water at a temperature of 40° F. to which chlorine is added in an amount to provide 10 p.p.m. and acidulated to a pH of 6.0 by the addition of lactic, phosphoric or citric acid. The mixture is again gently stirred for a period of 15 minutes after which the liquid is drained from the curd. The resulting curd is then trenched and allowed to drain for a period of from 45 to 60 minutes. The step of washing the curd with a controlled amount of wash water is for the purpose of leaving a residual amount of salt in the cottage cheese amounting to about .5% by weight so that the salt content may be varied for the particular market where it is to be sold. In some sections the consumers are used to and demand a highly salted product while in other sections the demand is for a low salt content. It will be understood that the amount of fresh water used in the washing step may be varied to give the required salt content to the finished product.

A prepared mixture of cream and/or milk solids together with salt, if required, may be added to the curd to give the desired fat and solid content to the cottage cheese. For example, cream and milk solids may be added to provide a milk fat and a 20% total milk solid content in the product. The stored cottage cheese is then ready for distribution and consumption.

It will now be observed that the present invention provides a method of treating cottage cheese for storage for long periods of time which may be practiced at little additional cost to the cost of storing similar products. It also will be observed that the present invention provides a method of storing cottage cheese for long periods of time without deterioration or loss of flavor or texture of the product.

While a preferred method of storing cottage cheese is herein described it will be understood that changes may be made in the steps of the method and the particular conditions specified in the specific example without departing from the spirit or scope of the invention. Therefore, without limitation in this respect the invention is defined by the following claims.

We claim:

1. The method of storing cottage cheese curd for a long period of time without deterioration which comprises the steps of adding a salt brine solution to the curd in a quantity to completely immerse the curd, storing the mixture at a temperature below 25° F. and above the freezing point of the mixture, and then washing the brine from the curd at the end of the storage period.

2. A method of storing cottage cheese in accordance with claim 1 in which the salt brine is a solution of sodium chloride containing chlorine in the ratio of 10 p.p.m. and acidulated to a pH of 6.0.

3. The method of storing cottage cheese in accordance with claim 1 which comprises storing the mixture of cottage cheese curd and brine within the temperature range of 22° F. and 25° F.

4. A method of storing cottage cheese in accordance with claim 1 which comprises adding sufficient brine solution to the curd at a concentration to produce a mixture having a freezing point below the storage temperature.

5. A method of storing cottage cheese in accordance with claim 1 which comprises mixing one pound of a substantially saturated solution of sodium chloride to each two to two and one half pounds of curd in successive layers.

6. A method of storing cottage cheese in accordance with claim 5 which comprises the steps of packing successive layers of curd and brine in a plastic container, closing the container so as to exclude air, initially storing the container in an atmosphere maintained at 40° F. for period of time sufficient to permit the brime to permeate the curd, and then storing the container in an atmosphere maintained at a temperature below 25° F. for the period of storage required.

7. A method of storing cottage cheese in accordance with claim 1 in which the brine is washed from the curd by placing the stored mixture in a vat, adding fresh water to the mixture, gently stirring the mixture, draining the fluid from the curd, and repeating the washing operation until the washed curd has the desired salt content.

8. A method of storing cottage cheese in accordance with claim 7 in which the wash water contains 10 p.p.m. of chlorine and is acidulated to a pH of 6.0 and refrigerated to 40° F.

9. A method of storing cottage cheese in accordance with claim 1 which comprises adding a milk fat to the washed curd to produce a desired milk fat content and adding milk solids to produce at least a 20% total milk solids content.

References Cited in the file of this patent

UNITED STATES PATENTS 2,446,550    North et al. _____ Aug. 10, 1948